United States Patent [19]

Kadija et al.

[11] 4,290,833

[45] Sep. 22, 1981

[54] METHOD FOR SEALING CATION EXCHANGE MEMBRANES OF CARBOXYLIC ACID TYPE FLUORINATED POLYMERS

[75] Inventors: Igor V. Kadija; Kenneth E. Woodard, Jr., both of Cleveland, Tenn.

[73] Assignee: Olin Corporation, New Haven, Conn.

[21] Appl. No.: 79,678

[22] Filed: Sep. 28, 1979

[51] Int. Cl.³ .................. B29C 27/08; B32B 31/20
[52] U.S. Cl. ........................... 156/94; 156/73.1; 429/4; 429/139; 429/249
[58] Field of Search ............. 156/73.1, 73.4, 217, 156/157, 94, 98; 429/139, 249, 4, 136; 264/23

[56] References Cited

U.S. PATENT DOCUMENTS

| | | | |
|---|---|---|---|
| 3,134,703 | 5/1964 | Listner | 156/157 |
| 3,508,989 | 4/1970 | Lawrence et al. | 156/73.1 |
| 3,772,089 | 11/1973 | Bennett et al. | 156/73.1 |
| 4,026,000 | 5/1977 | Anderson | 156/73.4 |
| 4,037,030 | 7/1977 | Sabatino | 429/139 |
| 4,115,240 | 9/1978 | Asawa | 204/296 |

FOREIGN PATENT DOCUMENTS 2655145 6/1978 Fed. Rep. of Germany .
1365483 9/1974 United Kingdom .............. 156/73.4

*Primary Examiner*—Michael G. Wityshyn
*Attorney, Agent, or Firm*—James B. Haglind; Donald F. Clements

[57] ABSTRACT

A method is provided for sealing portions of cation exchange membranes of carboxylic acid type fluorinated polymers. The portions of the membranes to be sealed are in the ester form of the membrane and are ultrasonically sealed at sealing times of from about 0.1 to about 5 seconds while employing power in the range of from about 50 to about 600 watts.

The novel method of the present invention can be used to repair membranes of carboxylic acid type fluorinated polymers which have been torn, slit, or cut. Sections of membrane materials may be sealed together to form an enlarged or reinforced membrane. The sealed portions are substantially free of wrinkles and are not mechanically damaged or weakened.

8 Claims, No Drawings

METHOD FOR SEALING CATION EXCHANGE MEMBRANES OF CARBOXYLIC ACID TYPE FLUORINATED POLYMERS

The present invention relates to a method of treating cation exchange membranes used in the electrolysis of aqueous salt solutions. More particularly, this invention relates to a method of sealing a cation exchange membrane used in the electrolysis of alkali metal chloride solutions.

For years commercial diaphragm cells have been used for the production of chlorine and alkali metal hydroxides such as sodium hydroxide which employed a deposited fiber diaphragm, usually of asbestos fibers. Porous asbestos diaphragms, while satisfactory for producing chlorine and alkali metal hydroxide solutions, have a limited cell life and once removed from the cell, cannot be reused. Further, asbestos has now been identified by the Environmental Protection Agency of the U.S. Government as a health hazard.

A suitable replacement for asbestos fiber diaphragms are ion exchange membranes which are produced from one or more polymeric materials. These membranes are impermeable to selected ions, for example, anions, and prevent the bulk flow of liquids through them while they permit the passage of other ions such as cations.

One type of membrane which is employed commercially is electrolytic cells is a cation exchange membrane of a carboxylic acid type fluorinated polymer. This membrane, however, has been found to be notch-sensitive and any small tears or punctures in the membrane are readily propagated, especially when the membrane is in the hydrolyzed form.

U.S. Pat. No. 4,115,240, issued Sept. 19, 1978, to T. Asawa et al describes a method of regenerating the electrochemical properties of a cation exchange membrane of a carboxylic type fluorinated polymer. The method includes pulverizing the deteriorated membrane either before or after converting the ion exchange groups to the acid form. The pulverized material is remolded using a heat treatment with suitable molding pressures.

In addition, to requiring regeneration after electrochemical deterioration, cation exchange membranes of carboxylic acid type fluorinated polymers are susceptible to damage by puncturing or tearing during cell assembly and cell operation. It is necessary therefore to possess a method for suitably repairing or joining these ion exchange membranes without resorting to their reformation.

It is an object of the present invention to provide a method of sealing cation exchange membranes of a carboxylic acid type fluorinated polymer used in the electrolysis of aqueous salt solutions.

Another object of the process of the present invention is to provide a method for sealing cation exchange membranes of a carboxylic acid type fluorinated polymer in the ester form.

These and other objects of the present invention are accomplished in a method for sealing cation exchange membranes of a carboxylic acid type fluorinated polymer which comprises:

(a) contacting portions of said membrane to be sealed in the ester form of said membrane, and
(b) ultrasonically sealing said portions.

More in detail, the novel process of the present invention is employed in, for example, repairing damaged portions or joining sections of a carboxylic acid type fluorinated polymer. When employed, for example, in the electrolysis of alkali metal or alkaline earth metal chlorides, cation exchange membranes of a carboxylic acid type fluorinated polymer which can be sealed by the method of the present invention have ion exchange groups of —(COO)—M; wherein M represents an alkali metal.

These cation exchange membranes can be fabricated by using various fluorinated copolymers. It is especially preferable to use copolymers produced by copolymerizing a fluorinated olefin monomer and a comonomer having a functional group of carboxylic acid group or a group which can be converted to a carboxylic acid group (hereinafter referred to as a carboxylic acid type functional group).

Suitable monomers and methods of fabrication of the carboxylic acid type fluorinated polymers are described in U.S. Pat. No. 4,065,366, issued Dec. 27, 1977, to Y. Oda et al; U.S. Pat. No. 4,126,588, issued Nov. 21, 1978, to H. Ukihashi et al; and U.S. Pat. No. 4,138,373, issued Feb. 6, 1979, to H. Ukihashi et al. The teachings of these patents are incorporated in their entirety by reference.

The fluorinated olefin monomers and the comonomers having the carboxylic acid type functional group can be selected as desired and especially can be selected respectively to form the units of

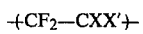

(a) and

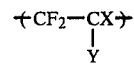

(b)

wherein

X represents fluorine, chlorine, hydrogen or —CF$_3$;
X' represents X or CF$_3$(CF$_2$)$_{\overline{m}}$;
m represents 1 to 5; and Y represents —PA or —O—(CF$_2$)$_{\overline{n}}$(P,Q,R)—A, wherein P represents —(CF$_2$)—a—(CXX')—b—(CF$_2$)$_{\overline{c}}$;
Q represents —(CF$_2$—O—CXX')—d;
R represents —(CXX'—O—ACF)—e;
P, Q, and R are arranged in optional order;
X and X' are defined above;
n represents 0 or 1;
a, b, c, d, and e respectively represent 0 to 6;
A represents —COOH or —CN, —COF, —COOR$_1$, —COOM, —CONR$_2$R$_3$ which can be converted to —COOH by hydrolysis or neutralization;
R$_1$ represents a C$_1$–C$_{10}$ alkyl group;
M represents an alkali metal;
and R$_2$ and R$_3$ respectively represent hydrogen or a C$_1$–C$_{10}$ alkyl group.

Suitable groups of Y include

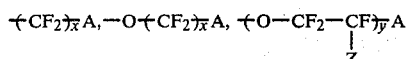

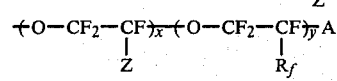

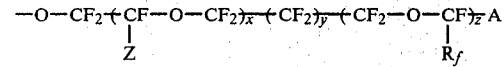

wherein x, y and z respectively represent 1 to 10 and Z and $R_f$ represent respectively —F or a $C_1$–$C_{10}$ perfluoroalkyl group; A is defined above. In the groups of Y, A is bonded to a fluorinated carbon group.

The copolymers having the units of (a) and (b) preferably comprise 1 to 40 mole percent, especially 3 to 25 mole percent of the units of (b).

The molecular weight of the fluorinated polymer for the cation exchange membrane is important as it influences the mechanical and electrochemical characteristics of the membrane.

The term $T_Q$ is related to the molecular weight of the copolymers and is the temperature that results in a melt volumetric flow rate of 100 mm$^3$/second. The volumetric melt flow rate is the rate of the molten copolymer flowed out from an orifice having a diameter of 1 mm and a length of 2 mm at a specific temperature under a pressure of 30 kg/cm$^2$ and is shown by units of mm$^3$/second.

It is preferable to have a high molecular weight to give a $T_Q$ of 130° to 380° C., especially 180° to 320° C.

The preparation of the copolymers can be modified by using two or more monomers or adding a third monomer. For example, flexibility is imparted by combining an α-olefin compound such as ethylene, propylene, and butene and $CF_2=CFOR_f$ wherein $R_f$ represents a $C_1$–$C_{10}$ perfluoroalkyl group. For example, improved mechanical strength can be imparted by crosslinking the copolymer by combining a divinyl monomer such as

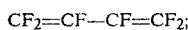

$CF_2=CF-CF=CF_2$;

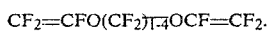

$CF_2=CFO(CF_2)_{1-4}OCF=CF_2$.

The copolymerization of the fluorinated olefin with the comonomer having the carboxylic acid type functional group or the third monomer, can be carried out by suitable conventional methods.

The copolymerization can be carried out by a catalytic polymerization, a thermal polymerization, or a radiation-induced polymerization by using a solvent such as halogenated hydrocarbons, if necessary.

The cation exchange membrane of the fluorinated polymer can be prepared by conventional processes for fabricating a membrane such as press-molding, roll-molding, extrusion, solution spreading, dispersion molding, or powder molding, to give a membrane thickness of 20 to about 600μ, preferably 50 to about 400μ.

When the copolymer having functional groups which can be converted to carboxylic acid groups is produced, the conversion of the functional groups to carboxylic acid groups may be accomplished by suitable treatment before or after the fabrication of the membrane. For example, when the functional groups are —CN, —COF, —COOR$_1$, —COOM, —CONR$_2$R$_3$ wherein M and R$_1$ to R$_3$ are defined above, the functional groups are converted to carboxylic acid groups by hydrolysis or neutralization with an alcohol solution of an acid or a base. When the functional groups are double bonds, they are converted to carboxylic acid groups after reacting them with COF$_2$.

The cation exchange membrane of the fluorinated polymer can be produced by blending a polymer of an olefin such as polyethylene, polypropylene, preferably, polytetrafluoroethylene or a fluorinated copolymer of ethylene and tetrafluoroethylene to the carboxylic acid type fluorinated polymer in the fabrication step of the membrane. It is also possible to reinforce the cation exchange membrane with a fabric support such as a cloth or a net; a nonwoven fabric or a porous film which is made of the fluorinated polymer.

Cation exchange membranes of the carboxylic acid type fluorinated polymer are normally in the form of films. However, it is within the scope of this disclosure to treat the process of the present invention membrane polymers regardless of their physical form.

According to the novel method of the present invention, the cation exchange membrane of the carboxylic acid type fluorinated polymer is in the ester form —(COO)—R$_1$, where R$_1$ is a C$_1$–C$_{10}$ alkyl group as defined above. The ester form of the membrane is a stable form which can be readily handled and is the preferred form for sealing operations such as making repairs or reinforcing or extending the membrane. Where the membrane is not already in the ester form, it is converted to the ester form.

During operation in an electrolytic cell, active ion exchange groups of the carboxylic acid type membranes are in the salt form —(COO)—M (M is an alkali metal). In sealing portions of membranes by the method of the present invention, it is necessary to convert the —(COO)—M groups in the area conducted to —(COO)—R$_1$ groups. This can be accomplished, for example, by first contacting the portion of the membrane to be sealed with an acid solution. Any acid may be used which will remove the alkali metal or alkaline earth metal to form the carboxylic acid group without interfering in the electrolysis process. Suitable acids include, for example, hydrochloric acid, sulfuric acid, nitric acid, and phosphoric acid. The concentration of the acid solution is not critical. Preferably an aqueous solution of hydrochloric acid is employed having a concentration of from about 10 to about 37 weight percent. The acid solution is applied to the area of the membrane to be sealed for a period of time, for example, from about 0.5 to about 24 hours.

The portion of the membrane which has been converted to the acid form of the membrane, —(COOH) is then esterified by known methods. For example, esterification may be accomplished by treatment with an alcohol, R$_1$OH, where R$_1$ is as defined above. The acid groups may also be converted to acid halide groups by the reaction with, for example, phosphorus trichloride, phosphorus oxychloride or thionyl chloride and then the acid groups are converted to ester groups by reacting them with the alcohol. The esterification with the alcohol is carried out by contacting the acidified portion of the membrane in the presence of an inorganic acid or organic acid for 0.5 to 40 hours.

In carrying out the method of the present invention, portions of the membrane in the ester form are contacted and sealed by the application of ultrasonic energy. Any suitable ultrasonic devices which are capable of generating sufficient heat to form a bond between the contacted portions of the membranes may be used. For example, ultrasonic welding devices employing power in the range of from about 50 to about 600 and preferably from about 100 to about 400 watts, can be used in the method of the present invention. These devices generate ultrasonic vibrations in the range of from about 20,000 to about 50,000 hertz.

Sealing times for bonding the contacted portions of the membrane in ester form are in the range of from about 0.1 to about 5 seconds, preferably from about 0.2 to about 2 seconds.

During the sealing and cooling stages, pressures in the range of from about 10 to about 200 pounds per square inch (psi) are suitably employed.

Heat sealing of membranes of carboxylic acid type fluorinated polymers in the ester form results in mechanical damage or weakening and extensive wrinkling of the sealed portions of the membrane. In contrast, ultrasonic sealing by the novel method of the present invention does not damage or weaken the membrane and substantially eliminates wrinkling of the sealed portions of the membrane.

The novel method of the present invention may be used to repair membranes of carboxylic acid type fluorinated polymers which have been torn, slit, or cut. The sealed portions are firmly bonded together and are visibly indistinct from untreated portions of the membrane. Sections of membrane materials may be bonded together to form an enlarged membrane or a membrane may be patched with a section of membrane material using the method of the present invention.

Sealed portions of cation exchange membranes of carboxylic acid type fluorinated polymers are as resistant, during electrolysis, to the passage of the hydroxyl ions from the cathode compartment to the anode compartment and the passage of anions from the anode compartment to the cathode compartment as the untreated portions of the membrane. The sealed portions are similarly resistant to fluid transport and prevent the flow of fluids from one electrode compartment to the other.

The novel sealing method of the present invention enables the separator to be formed in place using portable ultrasonic devices.

Although the invention has been described primarily with respect to sealing the ester form of the membrane, it can also be applied to sealing an ester form to an acid form or an acid form to an acid form.

In one embodiment of the method of the present invention, a fabric material is placed on both sides of the membrane in the area to be sealed. Sealing through the fabric provides more even distribution of pressure particularly when the membrane portions are ultrasonically sealed manually. The fabric material, for example, a felt fabric, also prevents the membrane receiving "imprints" from the tip of the ultrasonic sealing gun.

In another embodiment, it may be advantageous to use a heat dissipating means such as a metal strip in contact with the areas being sealed to prevent any possible damage due to local overheating.

After sealing, the bonded area is allowed to cool, preferably while maintaining the pressure used during the sealing. Cooling periods greater than the time required for sealing are preferred, for example, periods which are multiples of the sealing time in the range of 3 to 5.

The method of the present invention may also be used to seal cation exchange membranes of carboxylic acid type fluorinated polymers in the ester form to other materials including those of fluorinated polymers such as polytetrafluoroethylene, fluorinated ethylenepropylene (FEP), or polyvinylidene fluoride. When sealing these materials to the carboxylic acid type fluorinated polymer membranes, the sealing times and pressures are similar to those cited above.

The method of the present invention is illustrated by the following examples without any intention of being limited thereby.

EXAMPLES 1-5

Ten strips of a cation exchange membrane of a carboxylic acid type fluorinated polymer in the ester form were cut approximately 20 centimeters in length. Pairs of strips were ultrasonically sealed to each other along the length of the strips with an overlap of about 0.5 inch. Sealing was accomplished by manually applying an ultrasonic welding gun (Mastersonic, Inc. Granger, Indiana—Ultrasonic Handgun HG-600) along the portions to be sealed. For each set of strips, the sealing time was varied with the sealing times having 0.9; 0.6; 0.4; 0.3; and 0.2 seconds respectively. During the sealing, 300 watts of power was employed and a pressure of about 50 psi was applied. This pressure was maintained during the period when the sealed portions were cooled. After cooling, the sealed portions were examined and found to be visually similar to the unsealed portions of the membrane. The sealed portions were mechanically stronger than the unsealed portions of the membrane when tested manually. The pairs of strips were then soaked in a 25 percent solution of sodium hydroxide at 90°–95° C. for 16 hours. An examination of the sealed portions of the strips after the caustic treatment showed no defects in the seals and no loss of mechanical properties of the sealed portions.

EXAMPLE 6

A cation exchange membrane of the carboxylic acid type fluorinated polymer in the ester form was "patched" by sealing onto it a second section of the same membrane in the ester form. The section covered approximately 30 percent of the area of the membrane. The seal was applied along the edges of the section through strips of felt which were placed along the areas to be sealed. Using the ultrasonic gun employed in the previous examples, a sealing time of 1.5 seconds was employed at 300 watts of power and a manual pressure of 50 psi.

The patched membrane was installed in an electrolytic cell for producing chlorine and sodium hydroxide by the electrolysis of an aqueous solution of sodium chloride. The cell was operated for one month to produce sodium hydroxide solutions having a concentration of NaOH of 36 to 40 percent by weight. During the period of operation, there was no evidence of failure of the seals by bulk flow of liquids through the membrane nor was the ion exchange capacity of the membrane reduced.

What is claimed is:

1. A method for repairing portions of cation exchange membranes comprised of a fluorinated polymer having carboxylic acid type functional groups, said method which comprises:
    (a) esterifying said portions to provide carboxylic acid type functional groups in the ester form,
    (b) contacting portions of said membrane in said ester form to be repaired, and
    (c) ultrasonically sealing said portions.

2. The method of claim 1 in which the sealing time is from about 0.1 to about 5 seconds.

3. The method of claim 2 in which the molecular weight of said carboxylic acid type fluorinated polymer corresponds to a temperature for volumetric melt flow rate ($T_Q$) of from about 130° to about 380° C.

4. The method of claim 2 in which said ultrasonic sealing employs power in the range of from about 50 to about 600 watts.

5. The method of claim 4 in which said ultrasonic sealing is carried out at a pressure of from about 10 to about 200 pounds per square inch.

6. The method of claim 5 in which portions of said cation exchange membranes of the carboxylic acid type fluorinated polymer are ultrasonically sealed to a fluorinated polymer selected from the group consisting of polytetrafluoroethylene, polyvinylidene fluoride, and fluorinated ethylene-propylene (FEP).

7. The method of claim 3 or 6 in which said sealing time is from about 0.2 to about 2 seconds.

8. The method of claim 7 in which said ultrasonic sealing employs power in the range of from about 100 to about 400 watts.

* * * * *